United States Patent [19]

Gaasenbeek

[11] 4,085,697
[45] Apr. 25, 1978

[54] ALL-TERRAIN VEHICLE

[76] Inventor: Johannes Leonardus Gaasenbeek, 56, Burns Avenue, RR No. 3, Belleville, Ontario, Canada

[21] Appl. No.: 705,399

[22] Filed: Jul. 15, 1976

[30] Foreign Application Priority Data

Feb. 24, 1976 United Kingdom .............. 07255/76

[51] Int. Cl.² .................... B60F 3/00; B62D 11/04
[52] U.S. Cl. .................... 115/1 R; 180/6.2; 180/73 R
[58] Field of Search .............. 115/1 R; 180/71, 73 R, 180/70 R, 24.05, 6.2, 76, 85

[56] References Cited

U.S. PATENT DOCUMENTS

| | | | |
|---|---|---|---|
| 967,698 | 8/1910 | Wray | 180/70 R |
| 1,156,852 | 10/1915 | Van Sant | 180/70 R |
| 1,921,660 | 8/1933 | Church | 180/24.05 |
| 2,102,923 | 12/1937 | Szekely | 180/70 R |
| 2,552,690 | 5/1951 | Poirier | 180/73 R |
| 2,650,668 | 9/1953 | Hopkins | 180/71 |
| 2,894,592 | 7/1959 | Ordorica | 180/45 |
| 3,032,133 | 5/1962 | Brown | 180/71 X |
| 3,180,305 | 4/1965 | Gower-Rempel | 180/6.2 X |
| 3,263,763 | 8/1966 | Adams | 180/6.2 |
| 3,446,175 | 5/1969 | Boehler et al. | 115/1 R |
| 3,623,565 | 8/1971 | Ward | 180/6.2 |
| 3,653,455 | 4/1972 | Hetteen | 180/85 |
| 3,659,666 | 5/1972 | Forsyth et al. | 115/1 R |
| 3,809,004 | 5/1974 | Leonheart | 115/1 R |

FOREIGN PATENT DOCUMENTS

| | | | |
|---|---|---|---|
| 1,250,292 | 10/1964 | Germany | 115/1 R |
| 586,604 | 12/1958 | Italy | 180/76 |

*Primary Examiner*—Joseph F. Peters, Jr.
*Assistant Examiner*—John A. Pekar

[57] ABSTRACT

A steering and transmission arrangement for an off-road all-terrain vehicle provides for the drive ratios to each of the vehicle wheels to be geared up and down in unison so that each wheel receives a torque which is an average of the torque requirements of all the wheels. Steering is effected by varying the drive ratios to the left-hand and right-hand wheels differentially so that the wheels on one side are speeded up and the wheels on the other side are slowed down. The wheels are supported independently on longitudinally-extending legs pivotally connected on the vehicle body. Problems of stress on the drive train as the wheel legs rock up and down on rough terrain are avoided through a speed-reducing coupling at the pivotal leg connection and a torsional energy-storing drive shaft between the coupling and the wheel which absorbs small torques induced by the rocking of the legs and by rotational advancements and retardations of the wheels as they ride over local bumps in the terrain.

10 Claims, 10 Drawing Figures

ALL-TERRAIN VEHICLE

BACKGROUND OF THE INVENTION

1. Field of the Invention

The invention relates to a self-propelled vehicles and more particularly to steering, suspension and transmission arrangements for such vehicles, especially arrangements intended for use in off-road all-terrain vehicles.

2. Description of the Prior Art

Numerous prior proposals have been made for all-terrain vehicles having specialized transmission and steering control apparatus and suspension and drive apparatus designed for meeting the problems inherent in propelling and steering a vehicle over rough terrain. All such prior proposals of which the inventor is aware have been subject to certain disadvantages and defects. The nature of these disadvantages and defects, and the manner in which they are overcome by the present invention, are discussed more fully in the following description.

SUMMARY OF THE INVENTION

In accordance with this invention a vehicle having front and rear wheels at each side, has a suspension and drive for each wheel comprising a coupling between the wheel and one end of a longitudinally-extending torsion bar drive shaft which is supported on the vehicle body for pivoting about a transverse axis at the other end, where it is coupled through a speed-reducing drive, e.g. a worm gear meshing with a reducing worm, to a transverse driven shaft supported on the vehicle body. This form of suspension and drive allows the vehicle body to be supported high above the wheel axles and permits significantly greater ground clearances e.g. of the order of 15 inches, than can be readily obtained using the conventional axle drives. Whereas it has been proposed to support vehicle wheels independently on longitudinally-extending legs pivotally connected on the vehicle body, in prior proposals of which the applicant is aware, the front and rear axles on each side of the vehicle have been driven through chains engaging sprockets on the wheel axles. This presents the disadvantage that if the chains connected to the respective wheels are turned to differing extents or in opposition to one another, the chains may easily be subjected to tensions which are sufficient to break them. While attempts have been made to avoid this difficulty by employing frictional clutches in the chain drives, this has not proved satisfactory since power is lost through slippage at the clutch, and the clutches are liable to wear rapidly and to overheat. The apparatus of this invention avoids the above disadvantages and moreover provides an advantageous suspension and drive which may reduce rocking of the wheel leg about the transverse axis when torque is applied to the transverse drive shaft, since, by virtue of the speed-reducing drive, only a small turning moment is imparted to the wheel leg and therefore the suspension height of the vehicle is substantially unaffected by the amount of power transmitted to the vehicle wheels. Further, the torsion bar drive shafts allow each wheel to be momentarily advanced and retarded with respect to the other wheels, for example when riding over a local bump in the terrain, without unduly stressing the drive train. This allows the vehicle to have a four wheel drive without needing to use differentials or clutches.

BRIEF DESCRIPTION OF THE DRAWINGS

The invention will now be more fully described, by way of example only, with reference to the accompanying drawings, in which.

DESCRIPTION OF THE PREFERRED EMBODIMENT

Referring to the drawings, the vehicle has a unitary body 10 formed a sheet metal. A rectangular opening at the top of the body is defined by an inwardly projecting lip 11 from which a front panel 12 of the body slopes outwardly and merges with a flat bottom panel 13 which is generally cruciform in shape including a front portion 13a, two lateral portions 13b and c and a rear portion 13d from which an angled rear panel 14 extends upwardly to the lip 11. The front panel 12 and the underlying front portion 13a provide between them a space for the driver's legs and the rear portion 13d supports the engine 16 of the vehicle.

The body 10 is symmetrical about the longitudinal median line, and has at each side a flat side panel 17 which extends downwardly from the lip 11 and from the side edges of the front and rear panels 12 and 14. The panel 17 has cut-outs defining the openings of front and rear wheel wells 18 and 19 and a central downward extension 21 which joins with the outer edge of the adjacent lateral portion 13 b or c of the bottom panel 13.

The wheel wells 18 and 19 each have a curved upper panel 22 joined at the outer side to the adjacent side panel 17 and at the inner side to an inner vertical panel 23 which is connected to the side of the adjacent front or rear portion 13 a or 13 d of the bottom panel 13. Each of the inner panels 23 is formed with an inward rectangular recess 24 which accommodates a support leg 26 a or b for the front and rear wheels 27 a and b. Each recess 24 has an inner wall 28 off-set inwardly from the inner panel 23 and joined at its lower edge to a recessed edge of the adjacent front or rear portion 13 a or 13 d of the bottom panel 13, a panel 29 at one end, and an inclined top panel 31. The opposite end of each recess 24 is constituted by an inclining wall 32 which connects at the lower edge with the adjacent transverse edge of the adjacent lateral portion 13 b or c of the bottom panel 13. The top edge of the inclining wall 32 connects with the curved upper panel 22 of the adjacent wheel well 18 or 19 and with the top panel 31 of the recess 24.

Each of the joins between the above-mentioned walls and panels constituting the body 10 is made water-tight, so that the body 10 forms a water-tight hull, allowing the vehicle to float in water. A tube 33 passes longitudinally through each of the central side spaces between the opposed inclining walls 32, and is sealed to the walls 32 at its ends. A propeller 34 driven by a shaft 36 is mounted in each tube, to assist in propelling and steering the vehicle in water. The front end of each tube 33 may be covered by a screen to prevent matter from entering and fouling the propeller, and the rear end of the tube may have a nozzle for directing water in a direction best suited for propulsion.

The bottom of the vehicle body is smooth-surfaced so as to minimize drag in movement through water or over deep snow or mud.

Major portions of the body may be formed by bending up an initially flat blank. For example, the bottom panel 13 may initially be formed as a unitary flat blank having end portions of outline corresponding to the front and rear panels 12 and 14 which are then bent upwardly into the desired sloping configuration. In forming the front panel 12 of the body, the bending of the originally flat sheet up in a smooth continuous curve will provide the sheet metal at the front of the body with a pre-stressed skin. In order to economize on the use of the sheet metal, the portions of metal which are cut out to provide the wheel well openings 18 and 19 may be used as the inner panels 23 of the wheel wells.

Within the vehicle body 10 there is placed a generally cruciform supporting frame grid (not shown in the drawings). This frame, which may be formed as a casting from lightweight metal e.g. aluminium is in the form of a grid network of upstanding laterally and longitudinally extending inverted T-section ribs which serve to rigidify the frame. Upstanding bosses are included in the structure of the frame and serve as locating points to which the elements of the vehicle transmission and drive are bolted. The cruciform frame extends over the flat bottom of the vehicle body 10 and includes forward and rearward parts extending over the front and rear portions 13 *a* and *d* of the bottom panel 13 and lateral parts extending over the lateral portions 13 *b* and *c* of the bottom panel 13. The frame is fastened and bonded to the vehicle body 10 with rivets secured through the lower webs of the T-section ribs of the frame grid.

The engine 16 may be a conventional internal combustion engine and is supported on the rigid frame within the body 10. A shaft 37, aligned with and coupled to the output shaft 38 of the engine, carries a pair of speed-responsive expansible pulleys 39 and 41 which act as an automatic clutch. Two torque-responsive expansible pulleys 42 and 43 are located on opposite sides of the shaft 37 and are driven by the pulleys 39 and 41 through respective V-belts 44 and 46.

The left-hand wheels are driven from the pulley 42 and the right-hand wheels from the pulley 43. The connections between the pulleys 42 and 43 and the wheels are similar on each side of the vehicle, and only the left-hand side need be described in detail. A shaft 47 driven by the torque-responsive pulley 42 is connected through a reversing gear box 48 to a transverse shaft 49. The shaft 49 carries a pulley 51 coupled through a positive drive, preferably a timing belt 52, to a pulley 53 on a second transverse shaft 54. The pulleys 51 and 53 and the belt 52 all have interlocking ribbing so as to provide a positive drive without slippage occurring, permitting accurate control over the steering of the vehicle. The shaft 54 passes to the exterior of the body 10 through an aperture in the inner wall 28 of the recess 24 in the front wheel well 18 and passes through an intermediate gear box 56 to an outer gear box 57.

Within the gear box 56 the shaft 54 carries a reducing worm 55 meshing with a worm gear 58 carried on the rear of a longitudinally extending torsion bar drive shaft 59 which drives the front wheel. The torsion bar drive shaft 59 passes within the front support leg 26*a* to a front axle housing 61 wherein the wheel axle 62 is supported and is driven through mitre gears 63 and 64.

In the outer gear box 57, the transverse shaft 54 carries a mitre gear 66 meshing with a further mitre gear 67 coupled to the propeller shaft 36 passing through the tube 33. The propeller shaft 36 drives the rear wheel through a transmission similar to that associated with the front wheel, including a rear outer gear box 68 equipped with mitre gears, and a transverse shaft 69 passing through a rear intermediate gear box 71 and carrying within the gear box 71 a worm meshing with a worm gear carried on a torsion bar located within the rear support leg 26*b*. The rear torsion bar engages with the rear axle 72 through mitre gears within a rear axle housing 73. At the inner end of the rear transverse shaft 69 there is a circular member 74 to which a brake member can be applied.

Referring to FIGS. 2 to 5 these show the arrangement of the speed-responsive pulleys 39 and 41. The engine shaft 38 has a tapered end secured in a corresponding recess in a sleeve 76 by a bolt 77. The shaft 37 is splined to the sleeve 76 and is supported at its possible end in a self-aligning radial-thrust ball bearing mounted in a housing 78 secured to the rigid frame within the vehicle body.

Figures 2, 3:
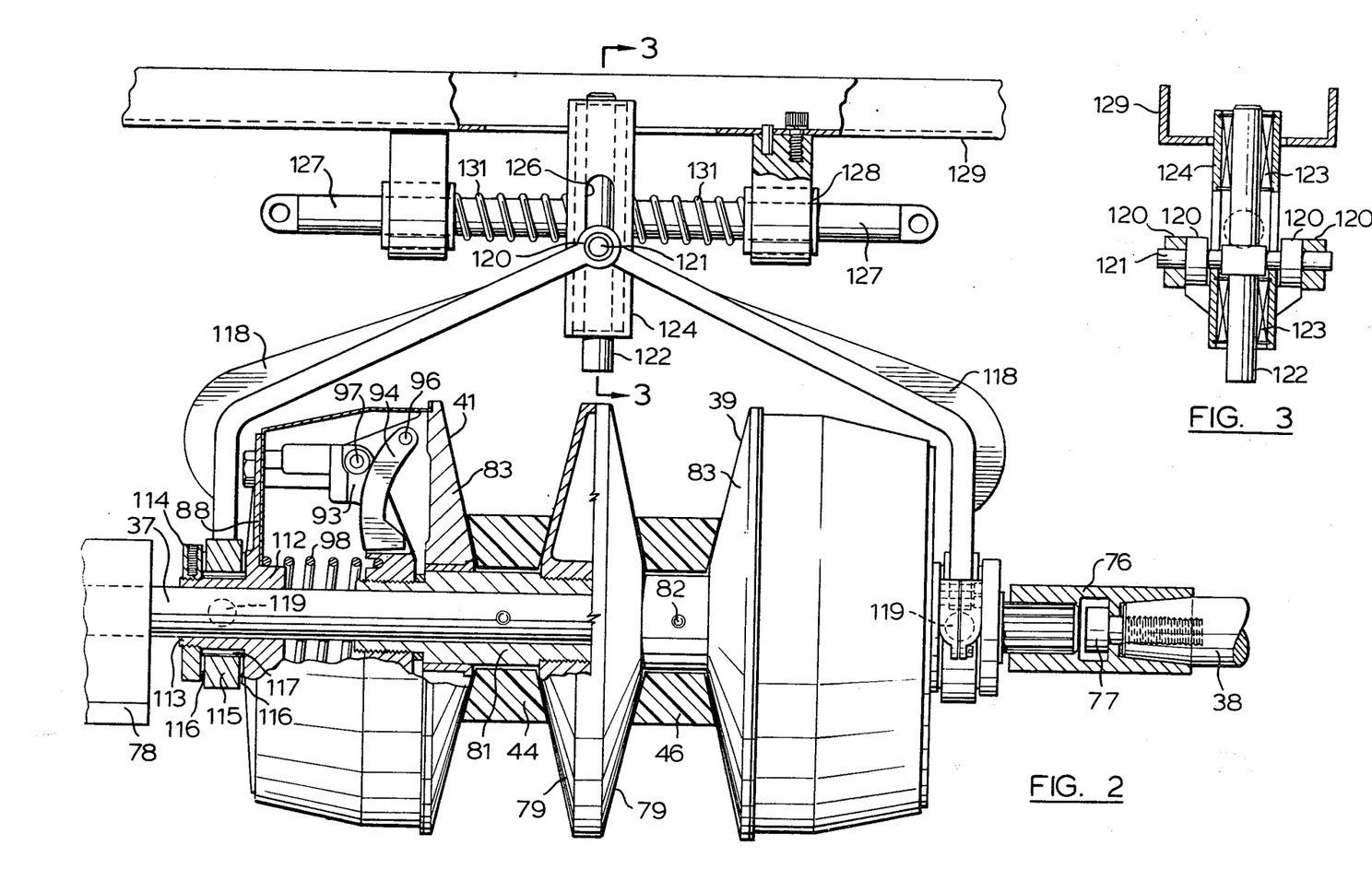
FIG. 2 shows a side view of the transmission and steering control apparatus of the vehicle partly in section on the line 2—2 of FIG. 1.
FIG. 3 shows a section on the line 3—3 of FIG. 2.

The pulleys 39 and 41 are similar to one another in structure and have respective fixed sheaves 79 which have coned inner sides and are threaded securely together back-to-back on a sleeve 81 fixed to the shaft 37 by radial pins 82. Each pulley has a movable sheave 83 which has a coned inner side. Each sheave 83 slides axially on the sleeve 81 and is linked to a cover plate 88 sliding on the shaft 37. Centrifugal weights 94 pivoted on the sheave 83 at 96 react with rollers 97 carried on a spider 93. The spider 93 is threaded on the sleeve 81 and drives the sheave 83 and cover plate 88 in rotation when the shaft 37 is turned. When the shaft 37 is stationary or turning at low speed, a compression spring 98 acting between the cover plate 88 and the spider 93 serves to space the moveable sheave 83 from its fixed sheave 79 by such distance, as illustrated in FIG. 2, that the V-belt 44 or 46 slips freely over the sleeve 81. When the shaft 37 rotates at a sufficiently high speed, depending on the force in the spring 98, the centrifugal weights overcome the force of the spring 98 and shift the movable sheaves 83 axially inwardly sufficiently to grip the V-belts 44 and 46, thus automatically engaging or disengaging the engine with the vehicle transmission in response to changes in the engine speed.

The torque-responsive pulleys 42 and 43 are similar to one another in structure. Each comprises a fixed sheave 99 and a movable sheave 101, both having coned inner mutually opposing faces. Each fixed sheave 99 has a cylindrical hollow hub which passes through a central aperture in the movable sheave 101, the movable sheave 101 being slidable axially on this hub. The output shaft 47 is keyed securely within the hollow hub of the fixed sheave 99. The end of the hollow hub extending beyond the outer face of the movable sheave 101 is fixed to a disc-shaped cam member which has part-helical cam surfaces on the inner side facing towards the outer side of the movable sheave 101, where the movable sheave 101 is formed with cam follower members which cooperate with the helical cam surfaces. A compression spring acts between the cam member and the movable sheave, urging the movable sheave towards the fixed sheave in opposition to the action of the tension in the V-belt 44 or 46, which tends to urge the sheaves apart.

In normal high speed running of the vehicle, the centrifugal weights 94 tend to urge the movable sheaves 83 of the speed-responsive pulleys 39 and 41 inwardly, so that the pulleys 39 and 41 have a large effective diameter. The tension in the V-belts 44 and 46 maintains the fixed and movable sheaves 99 and 101 of the torque-responsive pulleys 42 and 43 spaced relatively widely apart, so that the pulleys 42 and 43 are of small effective diameters and are driven in a high gear ratio from their respective speed-responsive pulleys 39 and 41.

When increased resistance is encountered by a ground wheel of the vehicle, the output shaft 47 of the associated torque-responsive pulley 42 or 43 will tend to be slowed, and the fixed sheave 99 will instantaneously tend to be retarded relative to the movable sheave 101. The cam member is thereby rotated through a small angle relative to the movable sheave 101 and urges the movable sheave 101 towards the fixed sheave 99 thus increasing the effective diameter of the pulley 42 or 43 in question. At the same time, because of the tension in the respective V-belt 44 or 46, the movable sheave 83 of the associated speed-responsive pulley 39 or 41 will tend to be shifted outwardly, to give a reduced effective diameter, and thus a lower gear ratio drive between the speed-responsive pulley and the torque responsive pulley is obtained permitting a higher engine speed and greater torque.

Conventional torque converter apparatus may be employed for the speed-responsive pulleys 39 and 41 as well as for the torque-responsive pulleys 42 and 43, such as, for example, the 100 Series torque converter system available from Comet Industries division of Hoffco, Inc., of Richmond, Ind., USA. The speed-responsive pulleys may be Comet 100 C clutch drivers, and the torque-responsive pulleys may be Comet 100 D driven units, with such modifications as are required to adapt them to the arrangement described above and illustrated in the FIGURES.

Referring to FIG. 2, the cover plates 88 of the speed-responsive pulleys include central bosses 112 and integral axially-extending sleeves 113. A retainer ring 114 is threaded onto the outer end of each sleeve 113 and retains a coupling ring 115 between thrust roller bearings 116 and radial roller bearings 117. A bent link 118 is pivotally connected at 119 to each coupling ring 115. The upper end of each link 118 includes a fork 120 pivotally connected on a rod 121 secured to a support rod 122 sliding vertically on linear bearings 123 within a cylindrical slide 124, the rod 121 travelling in slots 126 in opposite sides of the slide 124. The slide 124 is supported on a pair of longitudinally extending rods 127, connected on opposite sides of the slide 124, and the rods 127 themselves slide in linear bearings 128 connected to a longitudinal channel 129 fixed to the vehicle body. Compression springs 131 may be provided acting between the linear bearings 128 and the slide 124 to serve to maintain the slide 124 normally in a central position relative to the pulleys 39 and 41.

Figure 1:
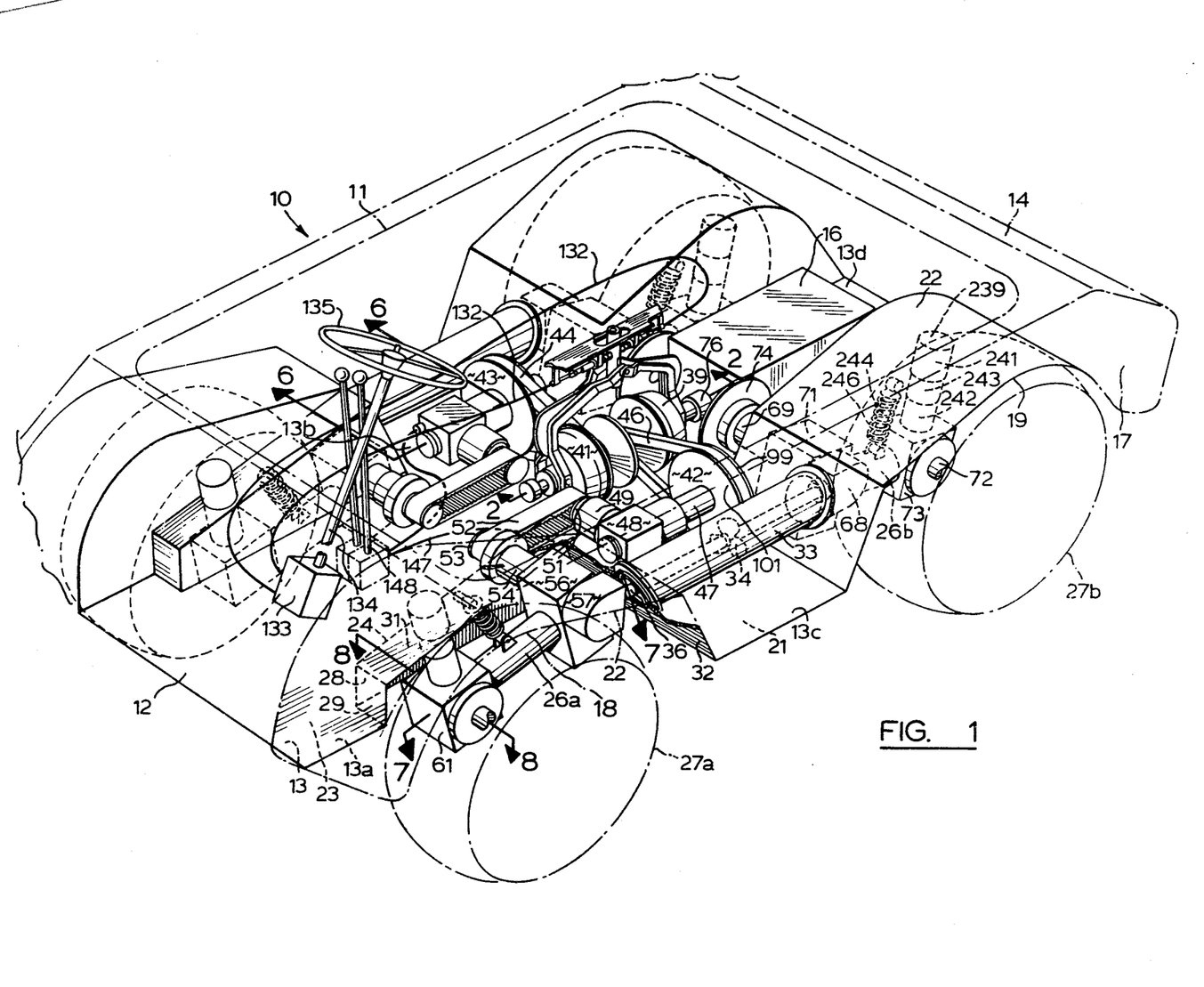
FIG. 1 shows a perspective view of an all-terrain amphibious vehicle, with the body shell indicated in broken outline.

As shown in FIG. 1, a cable linkage 132 between a steering box 133 and a steering column 134 permits the rods 127 together with the slide 124 to be shifted longitudinally under the control of the steering wheel 135.

When the vehicle is being steered straight-ahead, the cable linkage 132 exerts no net force on the rods 127, and the slide 124 assumes a central position. If while the vehicle is in motion over rough terrain, the ground wheels on one side of the vehicle encounter an obstruction which is not encountered by the wheels on the other side the effective diameter of the torque-responsive pulley on the said one side, say the left-hand side pulley 42, will tend to increase while the effective diameter of the associated speed-responsive pulley 39 will tend to decrease, as a result of the automatic self-adjustment described above, to meet the changed torque and speed requirements of the wheels on the left-hand side. However, the coupling through the links 118 between the movable sheaves 83 of the pulleys 39 and 41 ensures that both of the movable sheaves 83 will shift outwardly in unison by the same distance, since as the movable sheaves 83 associated with the pulley 39 shifts outwardly, the link 118 associated therewith is rocked downwardly driving the support rod 122 downwardly in the sleeve 124 and thus rocking the link 118 associated with the pulley 41 downwardly and driving the movable sheave 83 of the pulley 41 outwardly. At the same time the tension in the V-belts 44 and 46 will reduce allowing the sheaves 99 and 101 of both of the torque-responsive pulleys 42 and 43 to be closed towards one another under the action of the springs acting between the above-mentioned cam members and the movable sheaves 101.

Thus, the speed-responsive pulleys 39 and 41 will have adjusted to reduced effective diameters which are equal to one another, while the torque-responsive pulleys 42 and 43 will have adjusted to increased effective diameters equal to one another, giving a lower drive ratio to all four wheels of the vehicle and permitting higher engine speed and higher torque to overcome the obstacle. The resulting new speeds of the left-hand and right-hand wheels will be equal, so that the vehicle will continue to steer in a straight line. When the drive ratio changes as described above, there will be a resultant small pull on the rods 127 and the cable linkage 132 which will be felt at the steering wheel 135. However, the vehicle will continue to steer in a straight line providing the steering wheel is held stationary.

Figure 5:
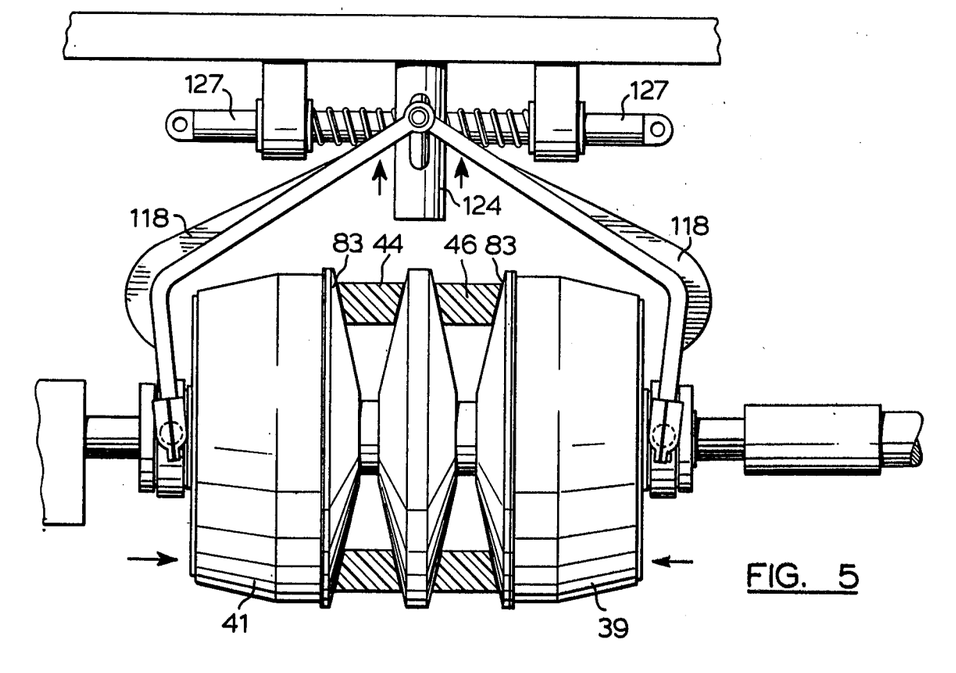

As soon as the obstruction is overcome, and the torque requirement of all the wheels has dropped to a low level, the effective diameters of the torque-responsive pulleys will tend to decrease, while at the same time the effective diameters of the speed-responsive pulleys will increase, the movable sheaves 83 of the pulleys 39 and 41 shifting inwardly in unison under the guidance of the links 118 which rock upwardly, as indicated by the arrows in FIG. 5. A higher drive ratio is obtained, giving lower engine speed and lower torque.

It will be appreciated that in operation, the effective diameter of each of the torque-responsive pulleys 42 and 43 is dependent, in inverse relationship, upon the instantaneous effective diameter of the associated speed-responsive pulleys 39 and 41, respectively, since the pulleys are coupled by the V-belts 44 and 46 and any elastic stretching of the V-belts can be ignored for practical purposes. Thus, in the running of the vehicle a dynamic equilibrium is established between on the one hand the force exerted by the centrifugal weights 94, tending to increase the effective diameters of the pulleys 39 and 41 and decrease the effective diameters of the pulleys 42 and 43, and on the other hand the sum of the forces exerted by the springs 98 and by the springs in the torque responsive pulleys, as well as the instantaneous reaction between the cam members and the movable sheaves in the torque responsive pulleys 42 and 43, which all tend to decrease the effective diameters of the pulleys 39 and 41 and increase the effective diameters of the pulleys 42 and 43. Under the influence of changes in the speed and torque-requirements of the ground wheels of the vehicle, the position of this equilibrium, as reflected in the effective diameters of the expansible pulleys 39 and 41, and 42 and 43, and thus the drive ratio between the wheels and the engine, will be shifted automatically, so as to maintain the vehicle in motion without stalling or overrunning the engine. Because of the linkage between the movable sheaves 83 of the pulleys 39 and 41, each wheel of the vehicle is driven at the same speed and has the same applied torque. Thus, the speed and torque requirements of all the wheels of the vehicle taken together are averaged out by the transmission, and each wheel is driven at a speed and under an applied torque which is an average of the total requirements of the four wheels.

Figure 4:
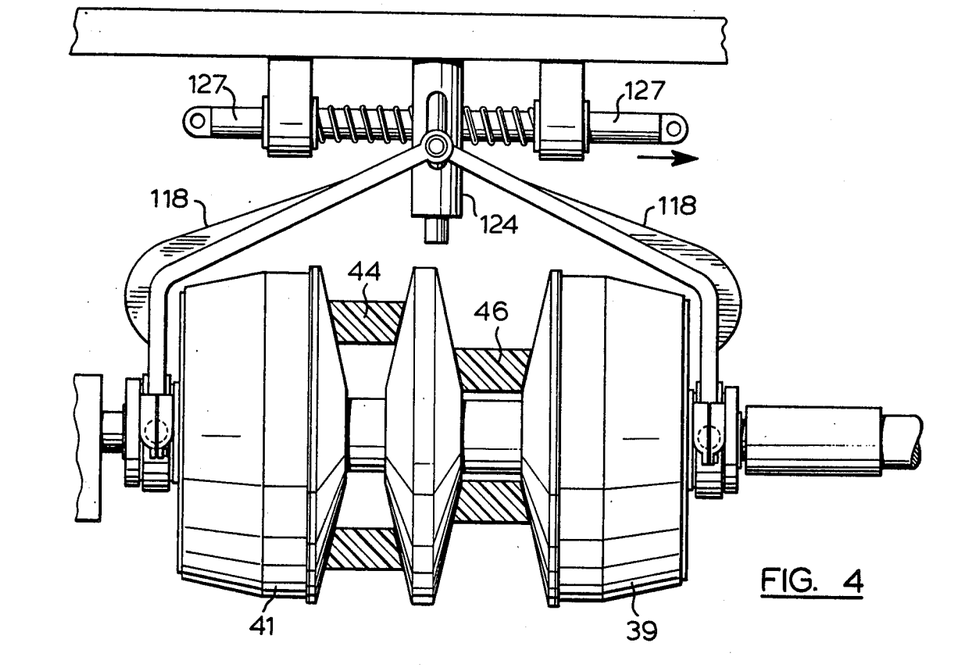
FIGS. 4 and 5 are side views corresponding to FIG. 2 illustrating the action of the transmission and steering control apparatus.

In steering the vehicle into a turn, rotation of the steering wheel 135 exerts a longitudinal pull on the rods 127 through the cable linkage 132, shifting the pair of rods 127 rearwardly in a left-hand turn and forwardly in a right hand turn. For example, as illustrated in FIG. 4, a rearward shift of the rods 127 together with the slide 124 biases the movable sheaves 83 of the speed-responsive pulleys so as to displace the equilibrium achieved within the apparatus in such manner as to decrease the effective diameter of the speed-responsive pulley 39, and to increase the effective diameter of the pulley 41. This increases the effective diameter of the pulley 42 associated with the left-hand wheels, and decreases the effective diameter of the pulley 43 associated with the right-hand wheels. This results in a higher drive ratio to the right-hand wheels and reduced drive ratio to the left-hand wheels, so that the vehicle's direction of travel deviates into a left-hand turn. Since one side of the vehicle is speeded up while the other side is slowed down by a corresponding amount, the speed at which the vehicle corners is the same as its former speed immediately before the turn.

The propeller shafts 36 coupled to the left-hand and right-hand wheels, respectively, will also be rotated at different speeds when the steering linkage is operated, so that when the vehicle is in water there will be a greater flow of water through the tube 33 on the one side of the vehicle and a reduced flow to the other side resulting from the different speeds of the propellers 34. Thus, the steering linkage also serves to steer the vehicle when it is afloat in water.

It will be noted that the steering linkage permits self-adjustment of the effective diameters of the speed-responsive pulleys 39 and 41 and the torque-responsive pulleys 42 and 43 while the vehicle is negotiating a turn, since the support rod 122 can slide up and down in the cylindrical slide 124 in response to movement of the links 118 even while the slide 124 is itself being biased forwardly or rearwardly under the action of the steering cable linkage 132.

Figure 6:
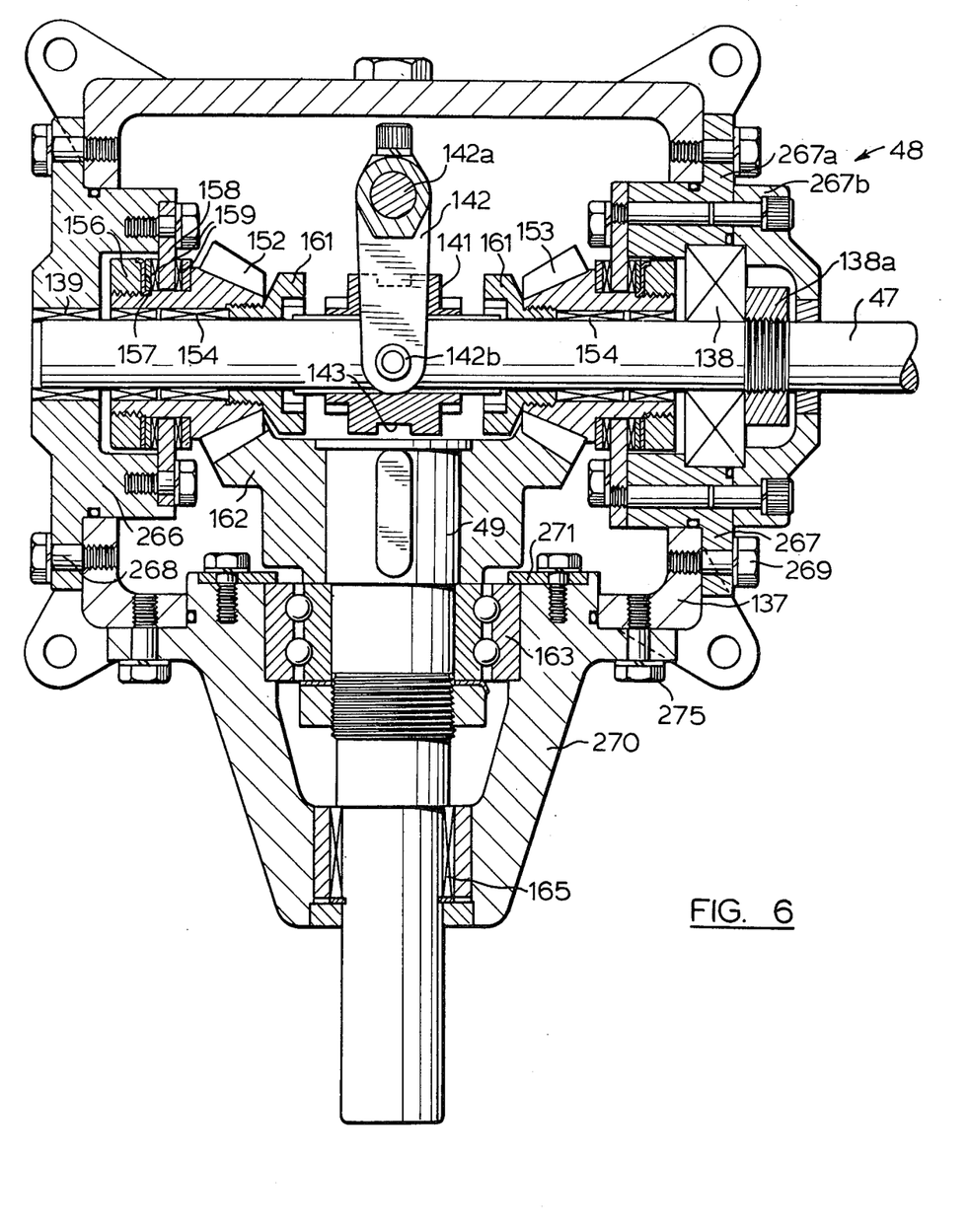
FIG. 6 shows the reversing gear on the right hand side of the vehicle partly in horizontal section on the line 6—6 of FIG. 1.

Referring to FIG. 6, this shows the arrangement of one reversing gear box 48. The gear box for the opposite side of the vehicle is similar. The box 48 comprises a housing 137 secured to the vehicle body and supporting the input shaft 47 from the torque-responsive pulley 43 against axial and radial movement in double ball bearing 138 held on the shaft 47 by a nut 138a and a radial roller bearing 139. A clutch member 141 is splined onto the shaft 47 and is shiftable longitudinally thereon under the action of a forked control arm 142 which can be rocked forwardly and backwardly by turning a transverse rod 142a on which the arm 142 is mounted. The arm 142 carries dogs pivoting on an axis 142b which ride in a channel 143 in the clutch member 141. The transverse rod 142a is preferably connected through pivotally-interconnected rigid links to a gear shift lever, giving a positive control over the movement of the clutch member 141. Alternatively, although less desirably, the clutch member 141 may be spring-biased to an extreme position, and is coupled to a Bowden cable 147 connected to a gear shift lever 148 as indicated in FIG. 1 movable to exert a pull on the cable 147 so that the clutch member 141 can be shifted against the action of the spring and is restorable to its extreme position under the spring force.

Two bevel gears 152 and 153 are supported rotatably on the input shaft 47, one on either side of the clutch member 141, each riding on radial roller bearings 154. Each of the bevel gears 152 and 153 has an axially-outward hub extension carrying a nut 156 forming with the bevel gear 152 or 153 a circumferential channel generally indicated at 157 into which extends an annular hardened disc 158 connected on the housing 137. The disc 158 retains the bevel gear against axial movement, with thrust roller bearings 159 being interposed between the disc 158 and the walls of the channel 157. The axially inner end of each of the bevel gears 152 and 153 carries an engagement member 161 for cooperation with the clutch member 141, and both of the bevel gears 152 and 153 engage with a central bevel gear 162 carried on the transverse output shaft 49 which is supported within the housing 137 on an axial and radial double ball bearing 163, and a radial roller bearing 165.

In a first, central position of the clutch member 141, as shown in FIG. 6 the member 141 is spaced out of engagement from both of the bevel gears 152 and 153 and the drive is placed in neutral. Under control of the gear shift lever, the clutch member 141 can be slid longitudinally to selectively engage the bevel gear 152 or 153, one position giving a reverse drive to the ground wheels through the central bevel gear 162 and shaft 49, the other position giving a forward drive.

As shown in FIG. 1, two separate gear shift levers 148 are provided so as to allow independent control of the gear boxes 48 associated with the left-hand and right-hand wheels, respectively. By placing one gear box in forward drive and the other in reverse the vehicle can be turned around in its own length both on land and when afloat in water.

Figure 7:
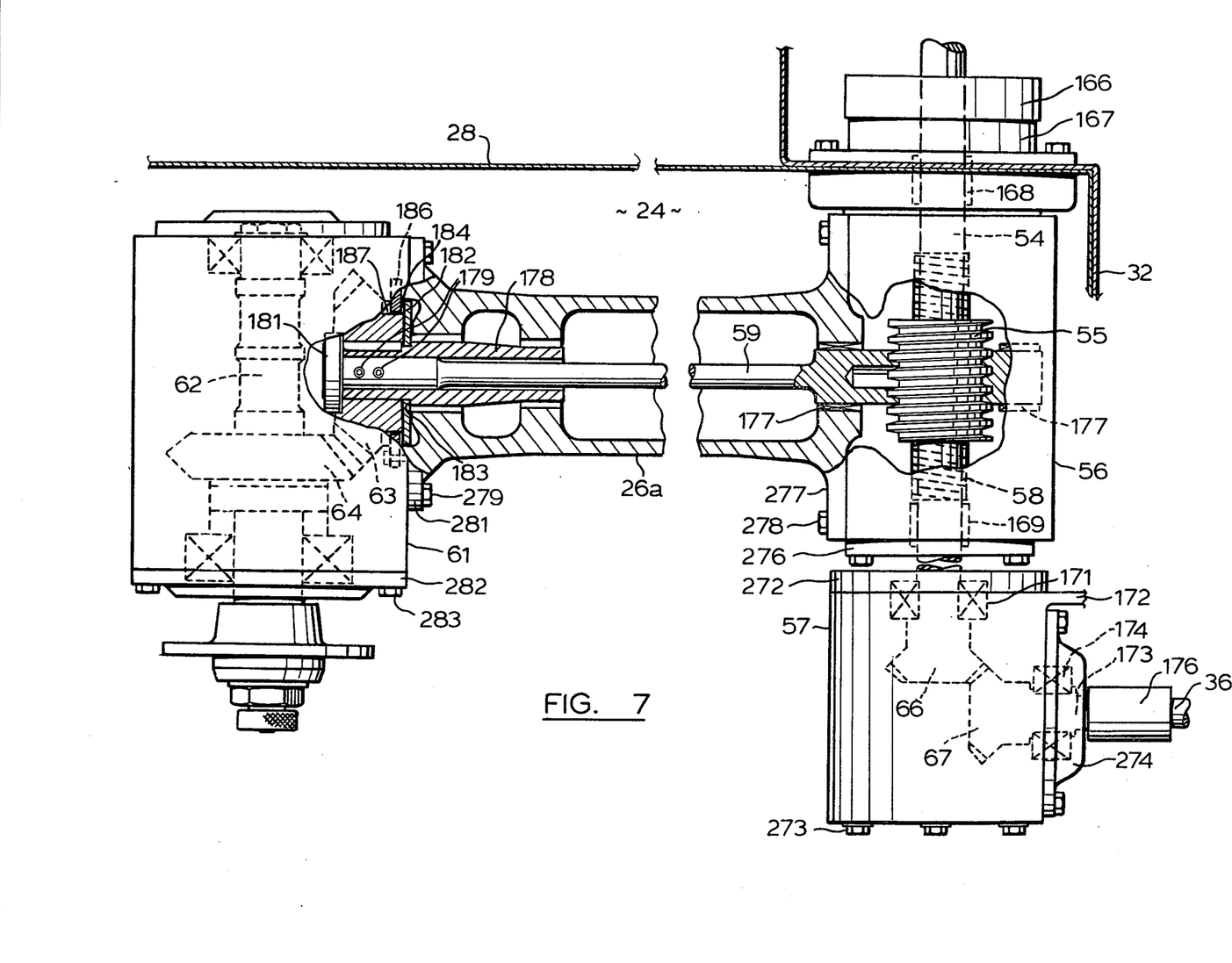
FIG. 7 shows one of the wheel-supporting legs of the vehicle partly in section on the line 7—7 of FIG. 1.

FIG. 7 illustrates the drive through one of the wheel-supporting legs of the vehicle. Each of the other supporting legs of the vehicle is similar. In the example illustrated the left-hand front intermediate gear box 56 receives the transverse shaft 54 which is driven from the output shaft 49 of the reversing gear box 48 through the pulleys 51 and 53 and the timing belt 52. The housing of the intermediate gear box 56 includes a cylindrical inward extension 166 which passes through and is supported rotatably on radial and thrust bearings within a collar 167 secured to the inner wall 28 of the rectangular recess 24 in the wheel well 18. Water-tight seals are provided between the collar 167 and the wall 28 and between the extension 166 and the collar 167, to prevent water from entering the vehicle body. The shaft 54 is supported on radial roller bearings 168 within the portion of the extension 166 passing through the collar 167 and on radial roller bearings 169 in the intermediate gear box 56. The outer end of the shaft 54 is supported on a radial and thrust double ball bearing 171 within the outer gear box 57 which is connected to the adjacent inclining wall 32 of the vehicle body through a rearwardly extending plate 172.

The mitre gear 66 carried on the outer end of the transverse shaft 54 meshes with the mitre gear 67 within the outer gear box 57. The gear 67 is carried on a short shaft 173 supported on a radial and thrust double ball bearing 174. The shaft 173 is splined and is coupled through an internally splined sleeve 176 to an end of the propeller shaft 36 pinned to the sleeve 176.

The torsion bar drive shaft 59 extends longitudinally below the transverse shaft 54 and carries the worm gear 58 which meshes with the worm 55 on the shaft 54. The bar 59 is supported at one end within the intermediate gear box 56 on radial roller bearings 177. At the other end the bar 59 carries a hardened sleeve 178, secured to the bar 59 by pins 179, or more preferably by a hexagonal internal connection. The mitre gear 63 is keyed on the sleeve 178. The gear 63 is retained on the sleeve 178 by a threaded ring 181. A hardened annular plate 182 is clamped between the rear side of the mitre gear 63 and a shoulder 183 on the sleeve 178 and acts as one race for a thrust roller bearing 184 for the sleeve 178. The other race is formed by a hardened annular plate 186 secured to the casing of the support leg 26a. The plate 186 also serves as one race of a thrust roller bearing 187 interposed between the plate 186 and the rear side of the mitre gear 63.

The suspension of the support legs 26a and 26b (which is described in greater detail later) permits each of these legs to rock about the axis of their respective transverse shafts 54 for the front legs or 69 for the rear legs, with the extension 166 of the intermediate gear box housing 56 or 71 rotating in the associated collar 167. It will be appreciated that when the vehicle travels over rough terrain, the support legs will continually be rocking upwardly and downwardly as the wheels ride over obstructions. The worm gear 58 is thereby rocked forwardly and backwardly about a horizontal axis and the movement relative to the worm 55 will tend to impart rotation to the torsion bar 59 through the interengagement of the teeth on the worm gear 58 with the worm 55. It is preferred to have a high reduction drive ratio between the worm 55 and gear 58, and this will typically be of the order of 10:1. While the above described steering and drive linkage, discussed in detail with reference to FIGS. 2 to 5, normally maintains an equal drive ratio to each wheel of the vehicle, the torsion bars 59 provide each wheel with a degree of independent freedom. Thus, if one vehicle wheel encounters a small obstacle, that wheel will tend to be turned through a greater distance than the other wheels as it travels over the longer path provided by the obstacle. This discrepancy will be absorbed as stored energy by the torsion bar winding-up without significantly influencing the automatic transmission and causing any change in the drive ratio, and the stored energy will be released by the wheel turning or slipping at its next opportunity for free movement during its travel over the rough terrain. The other wheels will similarly be continually advancing to small extents as each rides over obstacles, with the associated torsion bars continually winding-up and unwinding. Over a period of time, the advancements of each wheel will tend to cancel one another out.

The form of suspension and drive illustrated has been found in practice to give desirable suspension characteristics of smoothness and stability over rough terrain and although applicant does not wish to be limited to any particular theory, it is considered that the speed-reducing worm 55 and the worm gear 58 have the effect of reducing transmission of any turning movement to the wheel leg 26a or 26b when power is being transmitted by the transverse shaft 54 or 69 to the torsion bar 59. Desirable suspension characteristics are also attributable to the arrangement as shown in which the front legs 26a extend forwardly from a pivot point and the rear legs 26b extend rearwardly from a pivot point, especially when this arrangement is used in conjunction with the torsion bars 59.

Figure 8:
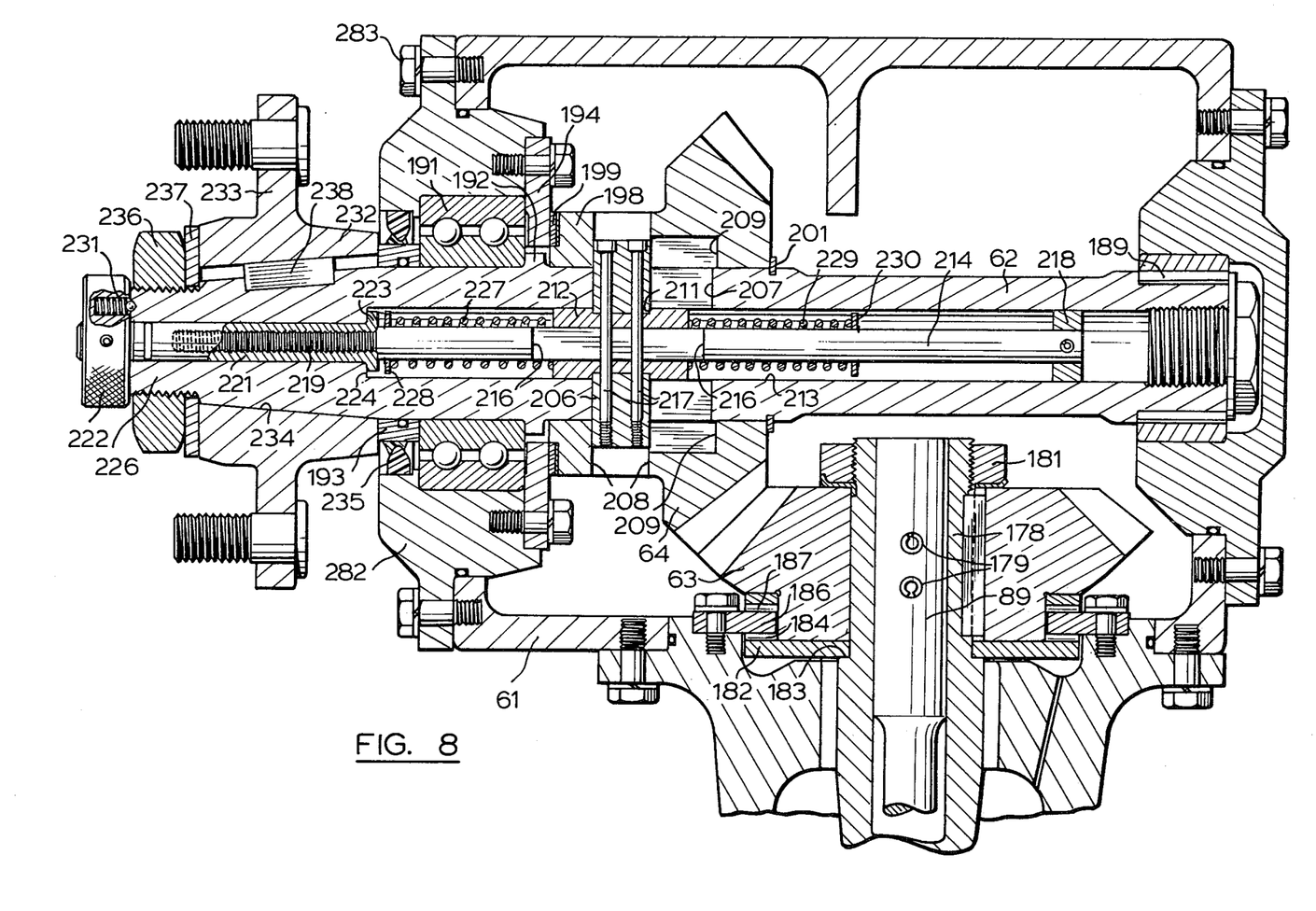
FIG. 8 shows an axle for a wheel of the vehicle in section on the line 8—8 of FIG. 1, with a detent between the drive and the wheel axle in engaged position.

Referring to FIG. 8, this shows the coupling between the wheel axle 62 and the mitre gear 64 which meshes with the mitre gear 63. The wheel axle 62 is supported in the axle housing 61 at the inner side on a radial roller bearing 189 and at the outer side in a radial and thrust double ball bearing 191 of which the inner race is retained between a shoulder 192 on the axle 62 and a collar 193, and the outer race is retained between the housing 61 and an annular plate 194 secured to the housing 61. The mitre gear 64 is a rotatable fit on the axle 62 and includes an outwardly extending hub 198. The mitre gear 64 is located on the axle 62 by, on one side, a thrust roller bearing 199 interposed between the outer face of the hub 198 and the plate 194 abutting the outer race of the bearing 191, and, on the other side, by a circlip 201 on the axle 62.

An engageable and disengageable connection is provided between the mitre gear 64 and the axle 62. This connection comprises a pair of radially-extending key blocks 206 which slide longitudinally of the axle 62 in respective slots 207 in the axle 62 and thus rotate together with the axle 62. In the engaged position shown in FIG. 8, the key blocks 206 enter a pair of slots 208 machined radially through the extension 198 of the mitre gear 64, and thus interlock the axle 62 with mitre gear 64. In the disengaged position, the blocks are slid longitudinally inwardly from the position shown in FIG. 8 and enter a cylindrical cavity 209 machined within the mitre gear 64, so that when the axle 62 is turned, the blocks 206 rotate freely within the hollow 209, without turning the mitre gear 64.

The base of each block 206 fits into a recess 211 in a cylindrical sleeve 212 which slides in a longitudinal bore 213 in the axle 62. A rod 214 passes slidably through the sleeve 212 and is formed with a slot 216 through which pass bolts 217 which retain the key blocks 206 in the recesses 211. One end of the rod 214 is equipped with a plug 218 sliding in the bore 213 and the other end has a threaded extension 219 engaging an internally threaded coupling member 221 which is connected to a knurled knob 222 at the outer end. The coupling member 221 is retained by a flange 223 at its inner end engaging a shoulder 224 in the bore 213 and by the knob 222 engaging the end of a threaded end portion 226 of the axle 62. The knob 222 can be turned by hand to rotate the coupling member 221 thus shifting the rod 214 inwardly from the position shown in FIG. 8 to the longitudinally inner position, as the member 221 turns on the screw-threaded extension 219.

A compression spring 227 acting between the sleeve 212 and a washer 228 retained by a circlip on the rod 214 urges the sleeve 212 so as to shift the key blocks 206 out of the slots 208 in the mitre gear extension 198 into the cylindrical cavity 209, to disengage the mitre gear 64 from the axle 62. To re-engage the mitre gear 64, the knob 222 is rotated by hand to draw the threaded extension 219 into the threaded coupling member 221. A compression spring 229 acting in opposition to the spring 227 on the sleeve 212 and seating on a further washer 230 retained by a circlip on the rod 214 urges the sleeve 212 in a direction tending to shift the key blocks 206 towards the slots 208. Even if the slots 208 are not initially aligned with the key blocks 206 they will come into alignment with the first half turn of the axle 62 allowing the key blocks 206 to slide into the slots 208. The knob 222 is equipped with a spring-loaded ball detent 231 which normally lodges in a recess in the end portion 226 of the axle 62 and releasably retains the knob 222 in a position such as to hold the key blocks 206 into the slots 208.

Each of the wheel axles of the vehicle has a disengageable connection as described above to allow it to be freed from the vehicle transmission. In the event of a mechanical breakdown each wheel axle can then be freed, enabling the vehicle to be towed or pushed to a location where repair can conveniently be carried out. Because of the reduction drive ratio between the worm gear 58 and worm 55 in each support leg of the vehicle, there is considerable resistance to back-driving of the transmission from the wheels, so that the vehicle cannot readily be towed or pushed until the wheel axles are disengaged.

FIG. 8 also shows the wheel hub 232, which carries a flange 233 to which the tyre-supporting rim is connected. The hub 232 has an internally tapered bore 234 and is held on a correspondingly tapered portion of the axle 52 by a lock nut 236 and washer 237 on the threaded end portion 226 of the axle 62. The hub 232 is keyed to the axle 62 by a key 238 preventing rotational slippage. The inner end of the hub 232 engages tightly against the collar 193 which in turn retains the inner race of the bearing 191. There is a rotary seal 235 between the collar 193 and the housing 61 to prevent water entering the axle housing 61.

Conventional flotation tyres may be employed for the ground wheels of the vehicle, and will assist in maintaining the vehicle afloat in water as well as absorbing to some degree impacts received by the wheels as they ride over bumps on rough terrain. It is desirable for the tyres to have pronouncedly raised treads so that they will give satisfactory grip in wide-rangeing conditions of the ground surface such as slippery mud surfaces as well as on sand or snow.

Each suspension leg of the vehicle is supported on an air spring 239. These air springs comprise an upper flange 241 connected to the upper panel 23 of the respective front or rear wheel well 18 or 19, a lower flange 242 connected to the axle housing 61 and a resiliently compressible rolling sleeve type flexible-walled air bag 243 spacing the flanges 241 and 242 apart. The air springs used have a characteristic such that they have extremely soft suspension characteristics over a wide compression range, up until a point at which they can be compressed further only with much greater difficulty. The air springs 239 can therefore be so selected and arranged that they harden up at the point of the desired maximum upward travel of the support legs 26a and 26b, thus greatly reducing any risk of the support legs 26a and 26b being forced upwardly in travel over rough terrain to such an extent that the vehicle body bottoms out. The air springs 239 will be at an intermediate level of compression in normal operation, in which condition they do not obey Hooke's Law. To provide a stable, equilibrium attitude for the vehicle, conventional fluid-pressure shock absorbers 244, assisted by conventional coil springs 246 are connected on pivots between the upper panels 22 of the wheel wells and the support legs 26a and b. The conventional springs will of course obey Hooke's Law and tend to restore the vehicle to its equilibrium attitude when the vehicle becomes tilted.

Figure 9:
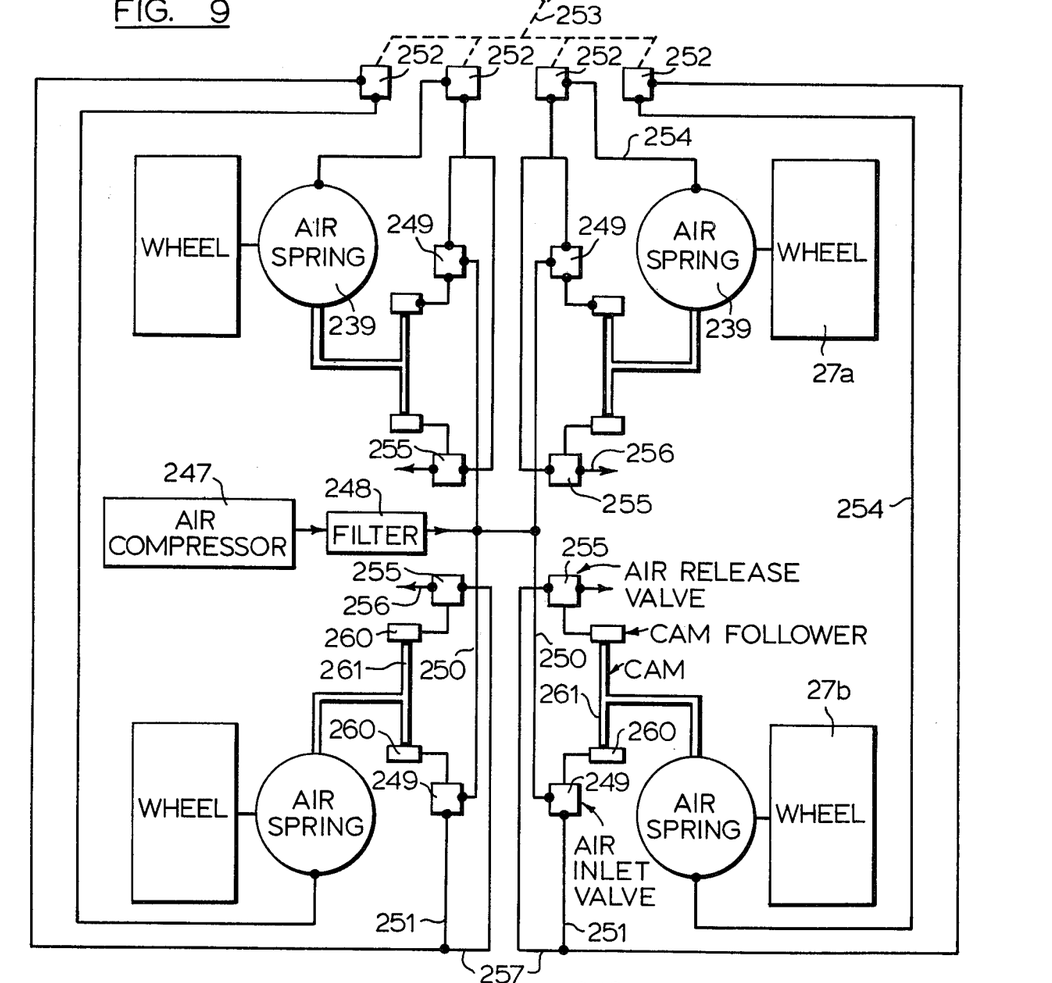
FIG. 9 shows pneumatic circuitry associated with the suspension of the vehicle.

Pneumatic circuitry as illustrated in FIG. 9 is connected with the air springs 239 so that the suspension may be adjusted to level the vehicle and maintain the vehicle body at a desired clearance from the ground. This circuitry includes an air compressor 247 driven from the vehicle engine 16 or electrically powered. Compressed air, optionally supplied through a reservoir, is fed through a filter 248 to each of four air inlet valves 249, one associated with each wheel 27a or b, through lines 250. The outlet side of each valve 249 is connected through a line 251 to a respective on-off levelling control valve 252. The valves 252 are ganged together as indicated at 253 so as to be opened or closed simultaneously through a hand lever. The valves 252 further communicate with their respective air springs 239 through lines 254. Each air spring 239 also has associated with it an air release valve 255 one side of which vents to the atmosphere at 256 and the other side of which is connected in common with the corresponding inlet valve 249 to the control valve 252 through a line 257. Thus when the control valves 252 are closed, the inlet valves 249 and release valves 255 are isolated from their air springs 239.

Figure 10:
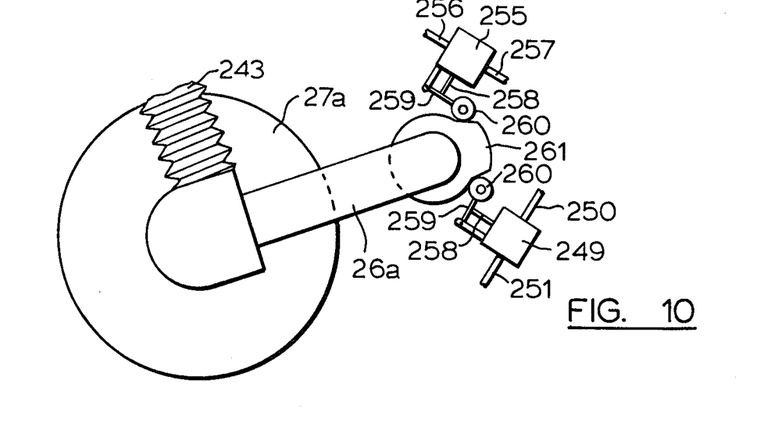
FIG. 10 shows the arrangement of pneumatic valves employed in the suspension system.

The valves 249 and 255 are on-off poppet valves, which, as shown in FIG. 10 each have a control plunger 258 which is actuated by a pivoting arm 259 connected to a cam follower 260 cooperating with a cam surface 261. The cam surface 261 is provided on the cylindrical inward extension 166 of the housing of the intermediate gear box 56 or 71 which rocks with the respective front or rear support leg 26a or b. The cam surface 261 and cam followers 260 are so arranged that the inlet valve 249 opens when the respective support leg 26a or b is in an attitude supporting the vehicle body at less than a pre-determined ground clearance which may be, for example, about 15 inches above the ground, while when leg 26a rocks downwardly at clearances above the pre-determined limit, the inlet valve 249 is closed and the release valve 255 is opened.

When the load of occupants and/or materials in the vehicle body is distributed in such manner that the vehicle body tends to be tilted fore and aft or to one side the levelling control valves 252 can be opened so as to adjust the suspension and level the vehicle. To carry out the levelling, the vehicle has to be standing on reasonably level ground. When the valves 252 are opened the inlet valves 249 and release valves 255 are placed in communication with their respective air springs 239 so that air is introduced through the valves 249 at corners where the clearance is insufficient and is vented to atmosphere through the valves 255 where the clearance is too great until equal clearance is achieved at each wheel. Once levelling is accomplished the control valves 252 are shut off so as to avoid losses or undesired introduction of air as the legs 26a and b rock up and down in normal driving.

For the braking apparatus of the vehicle, it would be possible to employ conventional hydraulically-operated disc brakes, with calipers acting on discs constituting the brake members 74 on the rear transverse shafts 69. It is preferred, however, to employ brake drums as the brake members 74, each drum co-operating with a pivotally mounted curved brake shoe which can be pulled against the action of a restraining spring into engagement with the outer surface of the brake drum. The two shoes are linked by a line which runs over a pulley intermediate the shoes. The axle of the pulley is connected through a master spring to the brake pedal and the ends of the line are connected to brake shoe levers on which the brake shoes are mounted and which are normally held clear from the brake drums by the restraining springs which are equal strength tension springs. Thus, when the brake pedal is pressed an equal force urges both shoes onto the drums. The master spring allows considerable movement of the brake pedal giving a greater "feel" to the braking effort which is directly proportional to the distance by which the brake pedal is depressed. It will be noted that by virtue of the linkage between the transmissions to the left-hand and right-hand wheels of the vehicle, the braking effort applied on each wheel is also equalised in the retarding forces exerted by the brakes are averaged out by the transmission, through the mechanism described above with reference to FIGS. 2 to 5, and an equal braking effect is applied to the left-hand and right-hand sides of the vehicle. Moreover, each wheel is still free to respond to the local terrain conditions when the brakes are applied, since each wheel is linked to the brakes through its respective torsion bar.

In order to minimize the weight of the vehicle, it is preferred to form the vehicle body 10 of lightweight e.g. aluminum sheeting and to employ lightweight aluminum castings for the inner rigidifying supporting frame, for the housings of the various gear boxes 48, 56, 57, 61, 68, 71 and 73 as well as for the propeller tubes 33 and the support legs 26a and b. High strength steel will normally be employed for the various drive shafts of the vehicle transmission. As the vehicle may be employed in widely varying conditions of temperature, especially when entering a cold body of water, allowance is made for differential expansion between the steel drive shafts and the aluminum housings of the vehicle. This is achieved by having each drive shaft supported on bearings which locate it against axial movement at only one point along its length, the other bearing or bearings of the shaft permitting free axial sliding. As shown in FIG. 2, the engine shaft 38 has the splined coupling 76, while the shaft 37 is supported at one end in the splined coupling 76, and only at the opposite end is the shaft restrained against axial movement. Each shaft 47 which extends from a pulley 42 or 43 to the reversing gear boxes 48 is restrained against axial movement only at a point intermediate its length by the double ball bearing 138, the other bearings for each of these shafts being the radial roller bearing 139 and a self-aligning ball bearing supported on high pedestals on the inner rigidifying frame at the end of the shaft 47 extending beyond the pulley 42 or 43 which will readily deflect shold axial forces become excessive. The front and rear transverse shafts 54 and 69 are restrained axially only at the bearings 171 in the outer gear box 57, the roller bearings 168 in the extension 166 and the bearing 169 in the housing 56 permitting axial movement. The torsion bars 59 are held axially in relation to the axle housing 61 by the roller thrust bearings 184 and 187 while the opposite end of the bar 59 can slide in the bearings 177. The propeller shafts 36 have the splined coupling 176 allowing for axial differential expansion. Lastly, the wheel axles 62 are restrained axially only at the double ball bearing 191 while the inner end of the axle can slide in differential expansion relative to the housing 61 in the radial roller bearing 189.

Since the axle housing 61 and support leg 26a as well as the outer and intermediate gear boxes 57 and 56 need to be sealed to prevent water from entering them, it is desirable to have these housings venting to the atmosphere to avoid any risk of the seals being burst on expansion or contraction of the volumes of air contained therein. This can be achieved by having passageways communicating between the axle housing 61 and the interior of the support leg 26a and between the latter and the interior of intermediate gear box casing 56. Axial bores may then be provided within the transverse shaft 54, with venting openings giving communication between the outer gear box 57 and the intermediate gear box 56 and between the latter and the atmosphere within the vehicle body. The vent openings within the vehicle body may be closed with a porous plug to prevent dirt from entering.

The housings and bearings of the drive shafts are arranged so as to permit ready access to the elements of the vehicle transmission for the purposes of repair or adjustment. The pivotal connections between each of the links 118 and the coupling rings 115 are demountable so that the links 118 may be detached from the rings 115 to allow removal of the V-belts from the pulleys 39 and 41, and to allow complete removal of the belts from the vehicle, the bearings supporting the forward end of the speed-responsive pulley shaft 37 and the rearward end of each torque-responsive pulley shaft 47 are demountable, and the torque-responsive pulleys can be slid towards the reversing gear boxes 48 after loosening set screws in respective holding collars which retain them on the shafts 47.

The housings 137 of the reversing gear boxes 48 are formed with opposing end caps 266 and 267 held on by respective sets of bolts 268 and 269 which can be loosened to allow access to the interior of the gear box or to allow the shaft 47 and the bevel gears 152 and 153 to be removed. The end cap 267 is formed in two parts 267a and b, and removal of the outer part 267b gives access to the bearing 138. The transverse shaft 49 passes through a side cap 270 held on by bolts 275 permitting removal of the shaft 49 together with the central bevel gear 162. An inner annular plate 271 is secured internally to the side cap 270 and can be removed to allow separation of the bearing 163 from the cap 270.

The housing of each outer gear box 57 includes a cap 272 on its inner side retained by bolts 273 passing through the gear box, the bolts 273 being accessible from the outer side to facilitate removal of the housing 57. A side plate 274 on the housing 57 can at the same time be removed to allow withdrawal of the mitre gear 67, the short shaft 173 and the bearing 174.

An outer plate 276 on the intermediate gear box 56 can be removed to allow the transverse shaft 54 to be withdrawn together with the worm 55.

An end flange 277 of the support leg 26a is coupled to the side of the intermediate gear box housing 56 through bolts 278. On separation of the flange 277 from the housing 56 an opening is exposed in the housing 56 of diameter greater than the worm gear 58, allowing the support leg 26a to be withdrawn from the housing 56 together with the torsion bar 59. The opposite end of the support leg 26a can be separated from the axle housing 61 on loosening bolts 279 coupling an end flange 281 to the side of the housing 61, permitting disassembly of the bearings 184 and 187. Finally, the axle housing 61 is fitted with a demountable outer side plate 282 connected by bolts 283 and on separation of the plate 282 from the housing 61, the wheel axle 62 complete with the bearing 191 and mitre gear 64 can be withdrawn from the housing 61.

It will be appreciated that the construction of the vehicle described in detail above with reference to the drawings is given by way of example only, and that numerous modifications may be made.

It can be more convenient to have the torque-responsive pulleys 42 and 43 mounted on parallel aligned shafts, both on the same side of shaft 37, particularly if the engine 16 is mounted transversely instead of fore-and-aft.

While the linkage above-described between the movable sheaves 83 of the pulleys 39 and 41 is particularly advantageous, an alternative form of linkage in accordance with prior proposals may be employed.

Other forms of reducing gearing may be employed between the transverse shafts 54, 69 and the torsion bars 59, as for example a reducing bevel or hypoid gear arrangement, while still retaining the advantage of having the torsion bar 59 twisted through only a small angle in response to rocking of the support leg 26a or b.

Instead of employing a Bowden cable type steering linkage between the steering wheel and the rods 127, and relying on the compression springs 131 to restore the slide 124 to a central position, positive control of the movement of the slide may be provided by coupling this directly or indirectly to a thick flexible control cable moved by a rack and pinion arrangement connected directly to the steering wheel. An adjustable brake offering variable resistance to movement of the cable may be included. This assists in maintaining the steering stable when driving the vehicle. Steering linkages of this type are commercially available and are used in boat steering gear.

The vehicle body 10 may be formed as a moulding, for example from glass fibre material, particularly where the inner rigidifying frame is employed as this itself gives a sufficiently rigid support for the elements of the vehicle transmission.

It may be desirable to add torsional vibration shock absorbers to the torsion bars 59 to damp any torsional vibration or resonance that may tend to occur.

What I claim is:

1. A self-propelled vehicle having a vehicle body, an engine supported on the body, front and rear ground wheels carried on the body at each side, at least one ground wheel on each side of the vehicle having suspension means acting between the wheel and the vehicle body for resiliently resisting upward movement of the wheel relative to the body, the wheel being coupled to and driven from one end of a torsional energy storing drive shaft extending longitudinally of the vehicle, means supporting said shaft on the vehicle for pivoting about a transverse axis at the other end of said shaft, a transverse drive shaft supported on the vehicle body at said other end of said longitudinal shaft and driving a speed-reducing drive coupling which drives said longitudinal energy-storing shaft, whereby small instantaneous advancements and retardations of the vehicle wheel and small torques derived from rocking of the wheel and its energy storing shaft about the speed-reducing drive coupling are stored in said energy-storing shaft without being transmitted to said transverse shaft, a transmission between the engine and each transverse shaft, and steering control means operatively connected to the transmissions for varying differentially the speed of a ground wheel on one side of the vehicle and a ground wheel on the opposite side of the vehicle so that one wheel is speeded-up while the other wheel is slowed down, whereby the steering of the vehicle can be effected.

2. A vehicle as claimed in claim 1 having a buoyant watertight body, a tube extending longitudinally along each side of the body and a propeller supported in each tube, the propeller being drivingly connected to the transverse shaft driving the ground wheel on the respective side of the vehicle body.

3. A wheeled vehicle having front and rear ground wheels at each side, wherein each wheel is driven through a torsional energy-storing drive shaft extending longitudinally of the vehicle, and including coupling means between one end of said shaft and its respective wheel, means supporting said shaft on the vehicle for pivoting about a transverse axis at its other end, a transverse shaft supported on the vehicle body at said transverse axis, means driving said transverse shaft, and a speed-reducing drive coupling between said transverse shaft and said energy-storing shaft.

4. A vehicle as claimed in claim 3 wherein said energy-storing shaft is a torsion bar drive shaft which has end portions of relatively large diameter and a portion of reduced diameter between the end portions, said reduced diameter portion extending along a major part of the length of the bar.

5. A vehicle as claimed in claim 3 wherein said coupling means between said one end of the energy-storing shaft and the wheel includes a releasable detent whereby the coupling can be disengaged.

6. A vehicle as claimed in claim 3 wherein said energy-storing shaft is supported within a water-tight casing, and including means supporting said energy-storing shaft for rotation about its axis in said casing and means pivotally connecting said casing to the vehicle.

7. A vehicle as claimed in claim 3 including a compressive air spring connected between each energy-storing shaft and the vehicle and resisting upward pivotal movement of the energy-storing shafts relative to the vehicle beyond a predetermined limit, and resilient means connected between each energy-storing shaft and the vehicle for resiliently resisting such upward movement whereby an equilibrium attitude tends to be restored to the vehicle.

8. A vehicle as claimed in claim 7 including an air release valve connected to said air springs for bleeding air therefrom, a source of compressed air, an input valve connected between each spring and the compressed air source, and valve control means associated with each wheel for closing the respective input valve when the wheel pivots downwardly to a predetermined position.

9. A vehicle as claimed in claim 3 including a positive, non-slipping drive connection between said transverse shaft and said drive driving means.

10. A vehicle as claimed in claim 3 wherein said speed-reducing drive coupling comprises a worm on said transverse shaft and a worm gear on said energy-storing shaft.

* * * * *